Patented July 8, 1941

2,248,491

UNITED STATES PATENT OFFICE 2,248,491

XENYL ARYLOXY ALKYL ETHERS AND METHOD OF MAKING SAME

Gerald H. Coleman, Lindley E. Mills, and Garnett V. Moore, Midland, Mich., assignors to The Dow Chemical Company, Midland, Mich., a corporation of Michigan No Drawing. Application March 16, 1939,
Serial No. 262,230

10 Claims. (Cl. 260—613)

This invention concerns certain new mixed ethers having the general formula,

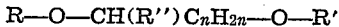

wherein R and R' are different aromatic radicals, one of them being a neutral radical of the xenane, i. e. diphenyl, series, and R'' is hydrogen or an alkyl radical. Such ethers are hereinafter referred to generically as xenyl aryloxy-alkyl ethers. They are useful as plasticizing agents in lacquers and varnishes and in nitrocellulose, cellulose acetate and cellulose ether compositions.

In our co-pending application Serial No. 90,380, filed July 13, 1936, of which this application is a continuation-in-part, we have disclosed a variety of xenoxy-alkyl halides having the general formula,

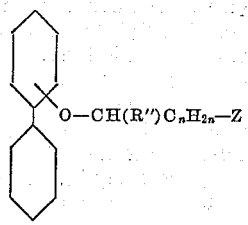

wherein the xenyl radical may contain neutral substituents such as halogen or alkyl groups, R'' represents hydrogen or an alkyl radical and Z represents a halogen atom. These xenoxy-alkyl halides are prepared by heating a dihalo-aliphatic hydrocarbon containing the halogen substituents on different carbon atoms to a reaction temperature with a metal xenate. The reactants may be employed in any desired proportions, but the yield of xenoxy-alkyl halide is greatest when one mole or more of the dihalo-aliphatic hydrocarbon reactant is used per mole of xenate. When the dihalo aliphatic hydrocarbon reactant is used in smaller proportion, a symmetrical dixenyl ether of glycol is usually formed in substantial yield. Examples of xenoxy-alkyl halides which may be prepared by the method of said application Serial No. 90,380 are 1-ortho-xenoxy-2-chloro-ethane, 1-ortho-xenoxy-2-bromo-ethane, 1-meta-xenoxy-2-chloro-ethane, 1-meta-xenoxy-2-bromo-ethane, 1-para-xenoxy-2-chloro-ethane, 1-para-xenoxy-2-bromo-ethane, 1-ortho-xenoxy-2-chloro-propane, 1-ortho-xenoxy-3-chloro-isobutane, 1-para-xenoxy-3-bromo-isobutane, 1-(5-chloro-ortho-xenoxy)-2-chloro-ethane, 1-(5-tertiarybutyl-ortho-xenoxy)-2-chloro-ethane, etc.

The xenyl arloxy-alkyl ethers of this invention are prepared by reacting an aryloxy-alkyl halide with a metal phenolate (or a mixture of a phenol and a metal hydroxide) in accordance with the equation:

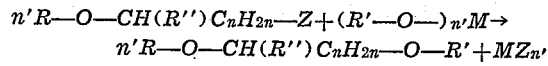

wherein R and R' are different aromatic radicals, one of them being a xenyl radical, R'' is hydrogen or an alkyl radical, Z is halogen, M is a metal, and $n'$ is the valence of the metal. The aryloxy-alkyl halide reactant may be any of the xenoxy-alkyl halides hereinbefore mentioned or it may be a compound such as 1-phenoxy-2-chloro-ethane, 1-naphthoxy-2-chloro-ethane, 1-(2-methylphenoxy)-3-bromo-propane, etc. The phenolate reactant is preferably an alkali metal, e. g. sodium or potassium, compound although phenolates of other metals, e. g. calcium or barium, can be used. Examples of phenolates which may be used are the sodium or potassium salts of phenol, cresols, xylenols, xenols, chlorophenols, bromophenols, amyl-chlorophenols, naphthols, etc. The reaction may be carried out in the presence or absence of a reaction medium, such as water, alcohol, benzene, etc.

The reactants may be employed in any desired proportions, but for sake of economy and to avoid side reactions which may otherwise occur, especially when water or alcohol is used as a reaction medium, the hydroxide is preferably employed in a proportion not greatly exceeding that required to form a salt of the phenol reactant. The phenolate and the aryloxy-alkyl halide reactants are preferably used in approximately equimolecular proportions, although they may be used in any proportions desired.

The reaction usually occurs smoothly at temperatures between 80° and 125° C., but it may be carried out at considerably higher temperatures, e. g. 200° C., if desired. It may be effected by heating the reaction mixture under reflux at atmospheric pressure or by heating it under pressure in a bomb or autoclave. The time of heating required to complete the reaction varies from a few minutes to several hours depending upon the particular reactants used, the temperature at which the reaction is carried out, etc.

The xenyl arloxy-alkyl ether product is separated by conventional procedure, e. g. by distillation of the reacted mixture.

The following examples illustrate certain ways in which the principle of the invention has been applied, but are not to be construed as limiting the invention.

*Example 1*

150 grams (1 mol) of para-tertiarybutyl phenol was dissolved in a solution of 40 grams (1 mol) of sodium hydroxide and 250 cubic centimeters of water. 232.5 grams (1 mol) of 1-ortho-xenoxy-2-chloro-ethane was then added and the resultant mixture was heated under reflux at temperatures between 90° and 103° C. for 24 hours. The mixture was then cooled and the oil layer thereof was separated, washed with hot water, and distilled under vacuum. There was obtained 112 grams (0.327 mol) of 1-(ortho-xenoxy)-2-(para-tertiary-butyl-phenoxy)-ethane as the fraction distilling at temperatures between 223° and 226° C. at 3 millimeters absolute pressure. The ether product melted at a temperature of about 70°–71° C. and was soluble in each of the solvents acetone, benzene, ethylene chloride, kerosene, and isopropyl ether. It has the formula,

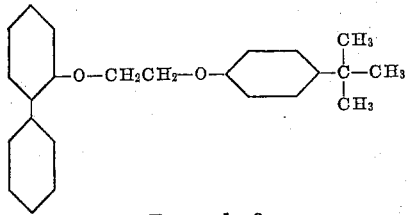

*Example 2*

A mixture prepared by dissolving 85 grams (0.5 mol) of meta-xenol in a solution of 20 grams (0.5 mol) of sodium hydroxide and 100 cubic centimeters of water and then adding 100.5 grams (0.5 mol) of 1-phenoxy-2-bromo-ethane was heated under reflux at a temperature of 105°–107° C. for 6 hours. The mixture was then cooled and the organic layer was separated and washed with water. The product was then separated by fractional crystallization of the mixture from ethanol. There was obtained 120 grams (0.414 mol) of 1-meta-xenoxy-2-phenoxy-ethane, a white crystalline compound having a melting point of approximately 81°–82° C. The product has the formula,

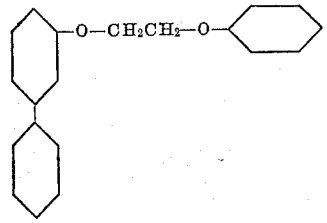

*Example 3*

56 grams (0.215 mol) of 1-(2,4,6-trichloro-phenoxy)-2-chloro-ethane was added to a solution of 48.7 grams (0.215 mol) of sodium 3-chloro-para-xenate (i. e. the sodium salt of 3-chloro-4-hydroxy-diphenyl), in 43 grams of water. The resultant mixture was heated under reflux at a temperature of approximately 103° C. for 24 hours, after which the ether product was separated as in Example 2. There was obtained 34 grams (0.08 mol) of 1-(3-chloro-para-xenoxy)-2-(2,4,6-trichloro-phenoxy)-ethane, a white crystalline compound having a melting point of approximately 118°–119° C. The product has the formula

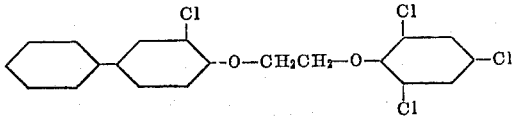

*Example 4*

23 grams (0.1 mol) of 1-para-xenoxy-2-cloro-ethane was added to a solution of 16.6 grams (0.1 mol) of sodium beta-naphthalate in a mixture of 44 grams of water and 90 cubic centimeters of ethanol (95 per cent concentration by volume). The resultant mixture was heated with agitation at a temperature of 150° C. in a bomb for 4 hours, after which the bomb was cooled and the charge removed. The product was separated as in Example 2. There was obtained 21 grams (0.06 mol) of 1-para-xenoxy-2-beta-naphthoxy-ethane, a white crystalline compound having a melting point of approximately 193.5°–194.5° C. and having the formula,

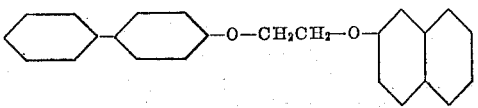

*Example 5*

A mixture of 116 grams (0.5 mol) of 1-ortho-xenoxy-2-chloro-ethane, 113 grams (0.5 mol) of 5-tertiary-butyl-ortho-xenol (i. e. 2-hydroxy-5-tertiarybutyl-diphenyl), 20 grams (0.5 mol) of sodium hydroxide, 21 grams of water and 150 cubic centimeters of 95 per cent concentrated ethanol was heated in a bomb at a temperature of 150° C. for 4 hours. The bomb was then cooled and the charge was removed. The mixture was acidified with dilute sulphuric acid, washed thoroughly with water and distilled. As the fraction distilling over the temperature range 260°–263° C. at 3 millimeters of pressure there was collected 163 grams (0.386 mol) of 1-(ortho-xenoxy)-2-(5-tertiarybutyl-ortho-xenoxy)-ethane as an extremely viscous yellow liquid. The product did not crystallize, but it appeared to be a supercooled liquid capable of crystallization. It has the formula,

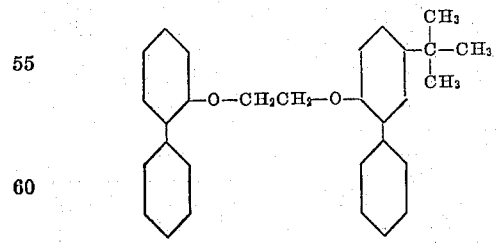

*Example 6*

A mixture of 61.6 grams (0.25 mol) of 1-(para-xenoxy)-3-chloro-propane, 44 grams (0.25 mol) of paracyclohexylphenol, 10 grams (0.25 mol) of sodium hydroxide, 10.5 grams of water, and 200 cubic centimeters of 95 per cent concentrated ethanol was heated in a bomb at a temperature of 140° C. for 4 hours. The bomb was then cooled and the charge removed. The reacted mixture consisted of a slurry of crystalline and liquid materials. It was warmed sufficiently to dissolve the solids, whereby two layers were formed, a viscous oily layer and a mobile alcoholic layer. The oily layer was separated, cooled to crystallization, and then purified by recrystallization from alcohol. There was obtained 71 grams (0.184 mol) of 1-(para-xenoxy)-3-(para-cyclohexylphenoxy)-propane as white crystalline material melting at a temperature of 88°–89° C. The product has the formula,

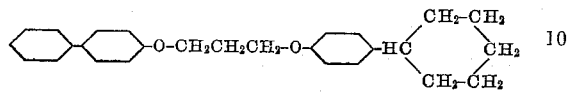

Examples of other xenyl aryloxy-alkyl ethers which may be prepared from an aryloxy-alkyl halide and a metal phenolate, as illustrated in the foregoing specific examples, are 1-phenoxy-2-ortho-xenoxy-propane, 1-(para-tertiarybutyl-phenoxy)-3-(meta-xenoxy)-isobutane, 1-(4-cloro-phenoxy)-3-(para-xenoxy)-propane, 1-(3-chloro-5-tertiaryamyl-para-xenoxy)-6-phenoxy-exane, 1-(di-tertiarybutyl-meta-xenoxy)-5-phenoxy-pentane, 1-(meta-xenoxy)-8-(2-chloro-phenoxy)-octane, etc. All such xenyl aryloxy-alkyl ethers are suited to the purposes hereinbefore mentioned.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A mixed ether having the general formula, R—O—CH(R'')$C_nH_{2n}$—O—R', wherein R and R' are different aromatic radicals, one of them being a neutral radical of the xenane series, R'' represents a substituent selected from the class consisting of hydrogen and alkyl radicals and $n$ is an integer.

2. A mixed ether having the general formula, R—O—CH$_2C_nH_{2n}$—O—R', wherein R and R' are different aromatic radicals, one of them being a neutral radical of the xenane series and $n$ is an integer of from 1 to 5.

3. A mixed ether having the general formula,

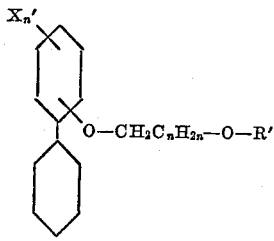

wherein R' is an aromatic radical of the benzene series, X is a neutral substituent of the class consisting of hydrogen, halogen and alkyl substituents, $n$ is an integer of from 1 to 5, and $n'$ is an integer of from 1 to 3.

4. A mixed ether having the general formula,

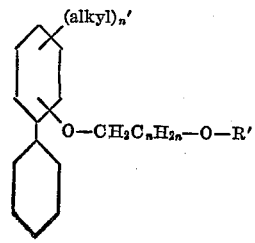

wherein R' is an aromatic radical of the benzene series, $n$ is an integer of from 1 to 5, and $n'$ is an integer of from 1 to 3.

5. A mixed ether having the general formula,

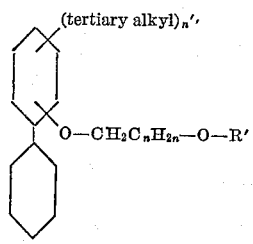

wherein R' is an aromatic radical of the benzene series, $n$ is an integer from 1 to 5, and $n'$ is an integer from 1 to 2.

6. 1-(ortho-xenoxy)-2-(para-tertiarybutyl-phenoxy)-ethane, a crystalline compound having a melting point of approximately 70°–71° C. and a boiling point of approximately 223°–226° C. at 3 millimeters pressure, and having the formula,

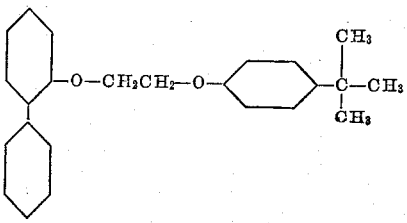

7. 1-(3-chloro-para-xenoxy)-2-(2,4,6-trichlorophenoxy)ethane, a compound having a melting point of 118°–119° C., and having the formula,

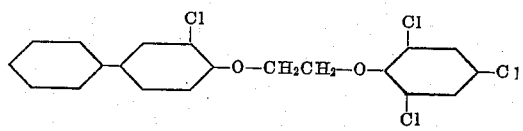

8. 1-(ortho-xenoxy)-2-(5-tertiarybutyl-ortho-xenoxy)-ethane, a compound having a boiling point of approximately 260°–263° C. at 3 millimeters pressure and having the formula,

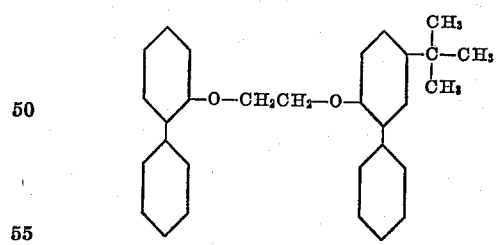

9. A mixed ether having the general formula,

R—O—CH$_2$CH$_2$—O—R'

wherein R and R' are different aromatic radicals, one of them being a neutral radical of the xenane series.

10. A mixed ether having the general formula,

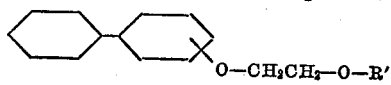

wherein R' is an aromatic radical of the benzene series.

GERALD H. COLEMAN.
LINDLEY E. MILLS.
GARNETT V. MOORE.